J. W. WALTER.
TRAP REST.
APPLICATION FILED JAN. 28, 1909.
959,659.
Patented May 31, 1910.
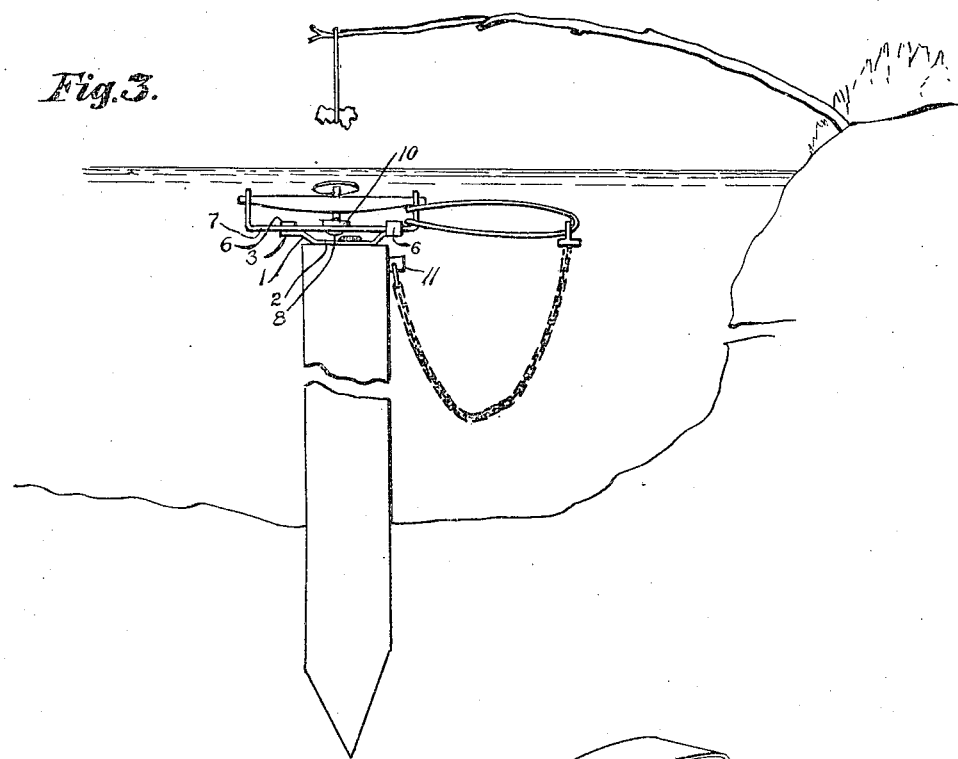
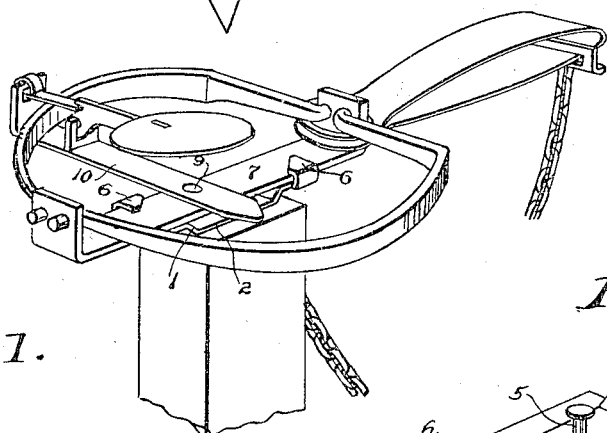
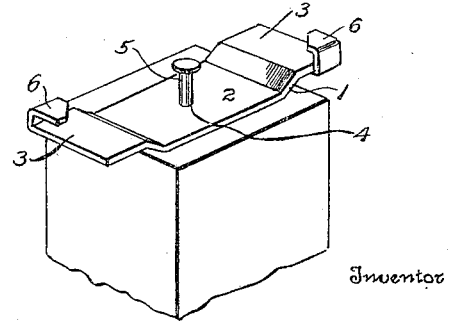

UNITED STATES PATENT OFFICE.

JOHN W. WALTER, OF CANTON, OHIO.

TRAP-REST.

959,659.  Specification of Letters Patent.  Patented May 31, 1910.

Application filed January 28, 1909. Serial No. 474,821.

*To all whom it may concern:*

Be it known that I, JOHN W. WALTER, a citizen of the United States, residing at Canton, in the county of Stark and State of Ohio, have invented a new and useful Trap-Rest, of which the following is a specification.

The invention relates to a device for holding a game trap in a particular place, with sufficient security to prevent its being displaced by any ordinary interference, but which at the same time will permit it to be detached by the struggles of an animal which may be caught in the trap.

When game traps are set on the ground or in shallow water, many animals escape from the trap by being able to tear or to gnaw their legs from the trap, and if the trap is set in an elevated position it is apt to become dislodged before any game is caught. By the use of the rest herein set forth, the trap may be set on the top of a stake, a fence or other elevated place, and by securing the free end of the trap-chain adjacent to the rest, when game is caught in the trap, the trap will be detached from its rest by the struggles of the animal, and the trap and animal will fall down and be suspended on the chain from the stake or fence, in which suspended position it is practically impossible for the animal to escape from the trap; and when the trap is set on a stake in deep water, it is quite evident that the animal will be drowned upon being submerged and suspended with the trap therein.

A preferred embodiment of the invention is illustrated in the accompanying drawings, forming part of this specification, in which—

Figure 1 is a perspective view of the trap mounted on the rest which is secured to the top of a stake; Fig. 2, a detached perspective view showing a simple and preferred method of securing the rest to the stake; and Fig. 3, a landscape section illustrating the use of the rest in deep water.

Similar numerals refer to similar parts throughout the drawings.

The rest consists of the horizontal bearing plate 1 which in its preferred form is depressed in its middle portion 2 and provided with the relatively elevated flat end portions 3; and the aperture 4 is provided in the middle depressed portion of the plate, by means of which the same is adapted to be secured to the top of the stake or other suitable object by the ordinary nail 5, such a nail, partly driven home, being shown in Fig. 3.

One or more inturned flanges 6 are formed or attached on the side edges of the plate, and in the preferred embodiment herein illustrated one of these flanges is provided on alternate sides of the elevated portions at each end of the plate. These flanges are adapted to engage over the side edges of the base bar 7 of the trap, and are preferably arranged to clamp the same by a slight spring or wedge action so that the trap will be held by the flanges against any ordinary interference, as the action of the waves in turbulent water, the action of the air or the swinging of the chain when the trap is exposed to the wind, or the ordinary contact of an animal; but at the same time the clamping action of the flanges is so slight that when an animal is caught the base bar of the trap is readily disengaged from the flanges by the extraordinary struggles of the animal to free itself, whereupon the animal encumbered by the trap will fall down and either be drowned in the water or suspended by the chain alongside the stake, from which position it is practically impossible for the animal to escape.

The depressed middle portion of the rest plate is adapted not only to receive the thickness of the head of the securing nail but to receive the lower head 8 of the rivet 9 which is usually employed for securing the cross bar 10 to the base bar of the ordinary form of trap illustrated; and the relatively elevated end portions of the plate provide independent bearings for the base bar of the trap and permit the same to be entered more readily under the corresponding inturned flange.

In use, the base bar of the trap is horizontally placed upon the bearing portions of the rest by being turned to enter between the ends of the flanges, the head of the cross bar rivet being preferably entered in the middle depression of the plate; after which the trap is rotated laterally to enter the edges of the base bar underneath the respective flanges, the same being adapted to clamp the bar by a slight spring or wedge action; and the free end of the chain member is preferably secured adjacent to the rest to the stake or other support, as by means of the ordinary staple 11.

It is evident that the middle depression of the rest plate is not an essential feature of the invention, but the use of the same is preferred for the reasons mentioned above; and it is also evident that the use of two inturned flanges is not essential, but the arrangement of two flanges, one located on opposite sides at each end of the rest, is preferred, as being best adapted to meet all the various practical or desirable requirements of the rest. Furthermore, it will be understood that the inturned flanges can be arranged to releasably engage the cross bar of the trap instead of the base bar, in which event the cross bar becomes the base bar of the trap with respect to the rest, and the term base bar in the following claims is intended to refer to the bar which is engaged by the flanges; and it will be understood that it is not intended to limit the scope of the invention to the specific form and arrangement of the preferred embodiment of the rest which is illustrated and described herein.

What I claim as my invention, and desire to secure by Letters Patent, is—

1. A trap rest including a horizontal plate supported from below on which the base bar of the trap is adapted to bear, the plate having a depressed middle portion and having inturned flanges on alternate sides of its end portions adapted to releasably engage over the side edges of the base bar.

2. A trap rest including a horizontal plate supported from below on which the base bar of the trap is adapted to bear, the plate having inturned flanges on alternate sides of its end portions adapted to releasably engage over the side edges of the base bar.

JOHN W. WALTER.

Witnesses:
 RUTH A. MILLER,
 JOSEPH FREASE.